United States Patent
Yabe

(10) Patent No.: US 8,479,894 B2
(45) Date of Patent: Jul. 9, 2013

(54) SHOCK ABSORBER

(75) Inventor: Hiroyuki Yabe, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/111,161

(22) Filed: May 19, 2011

(65) Prior Publication Data

US 2011/0290603 A1 Dec. 1, 2011

(30) Foreign Application Priority Data

May 28, 2010 (JP) ................................. 2010-122427

(51) Int. Cl.
  *F16F 9/34* (2006.01)
(52) U.S. Cl.
  USPC .................................... 188/282.8; 188/266.6
(58) Field of Classification Search
  USPC ............. 188/282.7, 282.8, 266.6, 318, 322.2, 188/322.14
  See application file for complete search history.

(56) References Cited

U.S. PATENT DOCUMENTS

| 4,325,468 A | * | 4/1982 | Siorek | 188/282.8 |
| 4,457,409 A | * | 7/1984 | Fukushima et al. | 188/282.5 |
| 4,561,524 A | * | 12/1985 | Mizumukai et al. | 188/282.4 |
| 4,768,629 A | * | 9/1988 | Wossner | 188/284 |

FOREIGN PATENT DOCUMENTS

JP 2001-214951 8/2001

* cited by examiner

*Primary Examiner* — Christopher Schwartz
(74) *Attorney, Agent, or Firm* — Wenderoth, Lind & Ponack, LLP

(57) ABSTRACT

A rod acceleration reducing mechanism is provided in a bottom-side oil chamber in an inner tube. The rod acceleration reducing mechanism includes a housing having a cylindrical accommodating casing screwed onto a fastening bolt of a bottom valve and a cap, a free piston displaceably fitted in the housing to define variable chambers at vertically opposite sides thereof, and elastic disks applying an elastic resistance to the displacement of the free piston. The variable chambers formed in the housing are variable in volume in response to pressure changes in the bottom-side oil chamber and the reservoir chamber. Thus, rod vibration can be generated by the rod acceleration reducing mechanism to reduce generation of rapping noise during running of the vehicle.

14 Claims, 4 Drawing Sheets

SHOCK ABSORBER

BACKGROUND OF THE INVENTION

The present invention relates to shock absorbers suitably used to damp vibrations of automobiles, for example.

In vehicles such as two- or four-wheeled automobiles, a hydraulic shock absorber is provided between a wheel-side member and a vehicle body-side member to damp vertical vibrations, etc. generated during running (for example, see Japanese Patent Application Publication No. 2001-214951).

SUMMARY OF THE INVENTION

In the shock absorber according to the related art, the piston rod of the shock absorber may vibrate to generate noise known as rapping noise when the pressure in the shock absorber changes.

An object of the present invention is to provide a shock absorber capable of suppressing the generation of rapping noise.

To solve the above-described problem, the present invention provides a shock absorber including a cylinder having a hydraulic fluid sealed therein, a reservoir chamber provided in communication with the interior of the cylinder, a piston slidably fitted in the cylinder to define a rod-side chamber and a bottom-side chamber in the cylinder, a piston rod secured at one end thereof to the piston in the cylinder and projecting at the other end thereof to the outside of the cylinder through a rod guide, and a damping force generating mechanism generating a damping force by movement of the piston. The shock absorber further includes a check valve opening during the compression stroke of the piston rod, a cylindrical passage member provided between the bottom-side chamber in the cylinder and the reservoir chamber, a partition displaceably provided in the passage member to define in the passage member a variable chamber that is communicated with the bottom-side chamber and that is variable in volume, an urging member urging the partition toward the reservoir chamber, and a limiter limiting the movement of the partition toward the bottom-side chamber within a predetermined range.

The above-described structure can reduce the generation of noise known as rapping noise.

DETAILED DESCRIPTION OF THE INVENTION

Shock absorbers according to embodiments of the present invention will be explained below in detail with reference to the accompanying drawings by way of an example in which the present invention is applied to a hydraulic shock absorber for a vehicle.

Figure 1:
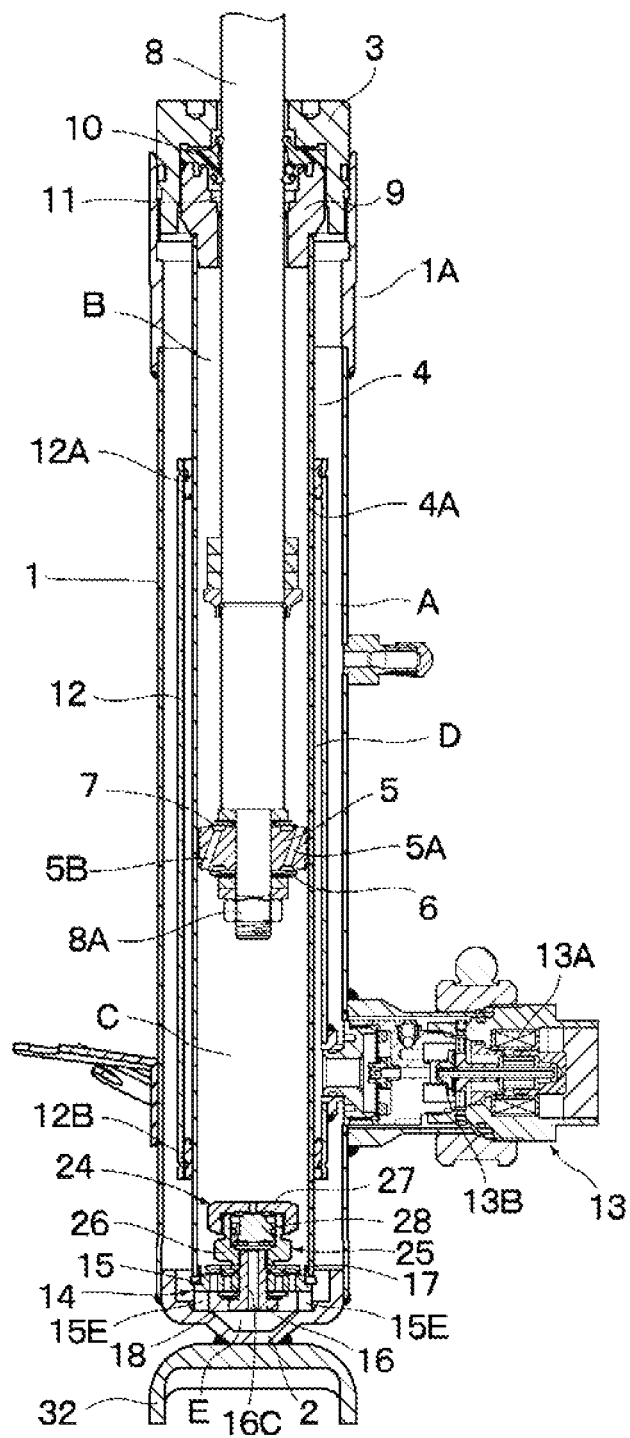
FIG. 1 is a vertical sectional view showing a hydraulic shock absorber according to a first embodiment of the present invention.
Figure 2:
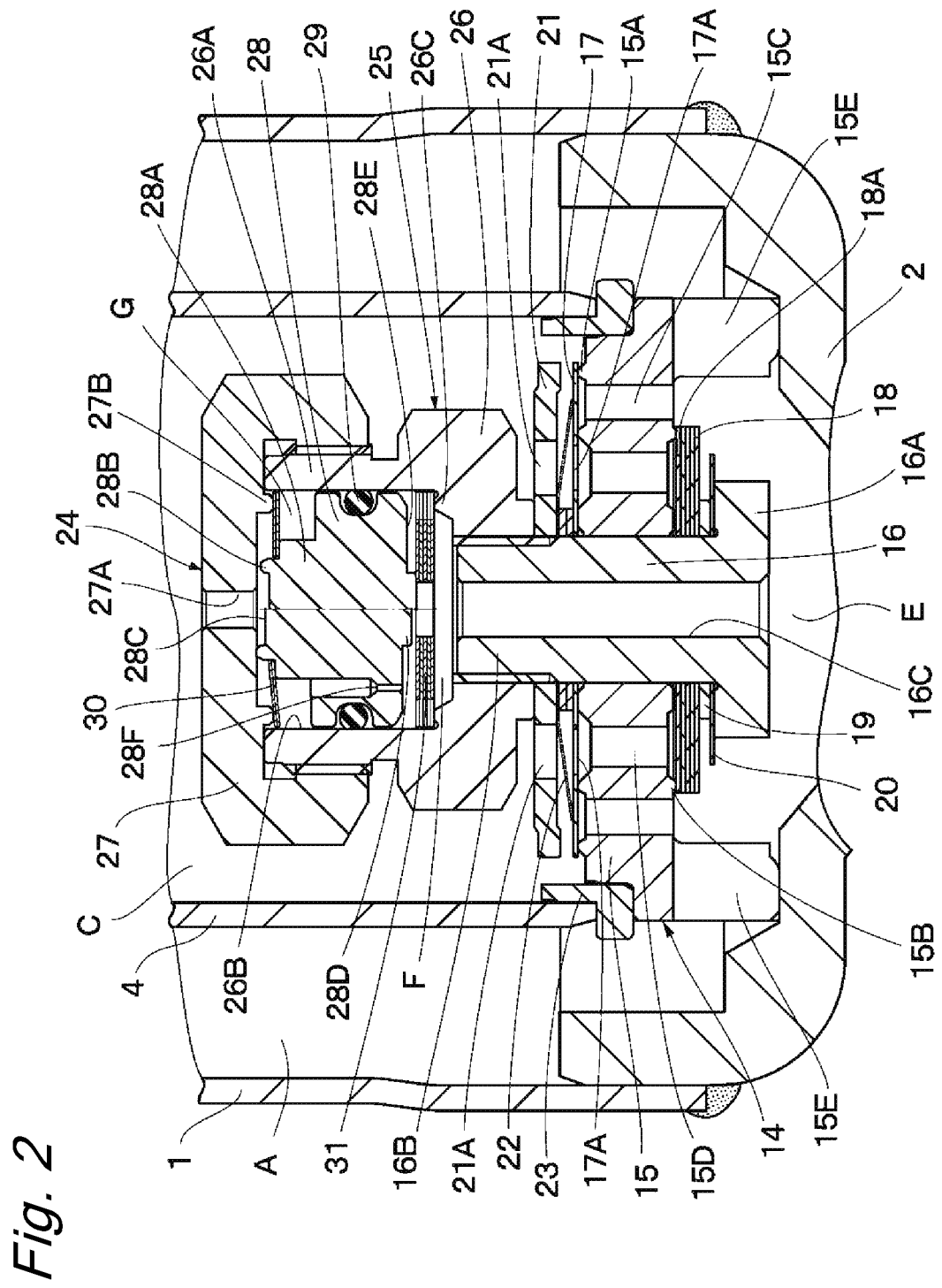
FIG. 2 is a fragmentary enlarged sectional view showing a bottom valve, a rod acceleration reducing mechanism, etc., in FIG. 1, in which the left-hand part of a free piston shows the free piston as displaced upward, and the right-hand part thereof shows the free piston as displaced downward.

FIGS. 1 and 2 show a first embodiment of the present invention. In the figures, reference numeral 1 denotes an outer tube in the shape of a cylinder, one end of which is closed. The outer tube 1 constitutes an outer shell of a hydraulic shock absorber. The outer tube 1 has a lower end, which is one end thereof, and an upper end, which is the other end thereof. The lower end, i.e. one end, of the outer tube 1 is closed with a bottom cap 2 as a base cap by using welding or other method. The upper end, i.e. the other end, of the outer tube 1 is open. The upper end of the outer tube 1 forms a cylindrical securing portion 1A to which a cap member 3 (described later) is secured by thread engagement.

Reference numeral 3 denotes a cap member provided on the upper end of the outer tube 1. The cap member 3 closes the upper end of the outer tube 1, which is an open end. The cap member 3 is secured at the outer periphery thereof to the cylindrical securing portion 1A of the outer tube 1 to hold a rod guide 9 (described later) so that the rod guide 9 is prevented from coming off the outer tube 1. The rod guide 9 and a seal member 10 (described later) are provided at the inner peripheral side of the cap member 3.

Reference numeral 4 denotes an inner tube serving as a cylinder, which is coaxially provided in the outer tube 1. The lower end of the inner tube 4 is fitted and secured to a bottom valve 14 (described later). The upper end of the inner tube 4 is fitted and secured to the rod guide 9. The inner tube 4 has hydraulic oil sealed therein as a hydraulic fluid. A hydraulic fluid usable in the present invention is not limited to hydraulic oil but may be water mixed with an additive, for example.

An annular reservoir chamber A is formed between the inner tube 4 and the outer tube 1. The reservoir chamber A has the above-described hydraulic oil and a gas sealed therein. The gas may be air placed under the atmospheric pressure or a compressed gas, e.g. hydrogen gas. The inner tube 4 has an oil hole 4A radially bored at an intermediate position in the longitudinal (axial) direction thereof. The oil hole 4A allows a rod-side oil chamber B (described later) to be constantly communicated with an annular oil chamber D (described later).

Reference numeral 5 denotes a piston 5 slidably fitted in the inner tube 4. The piston 5 divides the interior of the inner tube 4 into a rod-side oil chamber B as a rod-side chamber and a bottom-side oil chamber C as a bottom-side chamber. The piston 5 has a plurality of circumferentially spaced oil paths 5A and a plurality of circumferentially spaced oil paths 5B, which allow communication between the rod-side oil chamber B and the bottom-side oil chamber C.

The piston 5 has an extension-side disk valve 6 provided on the lower end surface, i.e. one side, thereof. The disk valve 6 opens if the pressure in the rod-side oil chamber B exceeds a relief set pressure when the piston 5 is slidingly displaced upward during the extension stroke of a piston rod 8 (described later), thus relieving the pressure in the rod-side oil chamber B at this time to the bottom-side oil chamber C through the oil paths 5A. The relief set pressure is set higher than a valve opening pressure of a damping force control valve 13 (described later) when set to "hard" characteristics.

The upper end surface, i.e. the other end, of the piston 5 is provided with a compression-side check valve 7 that opens when the piston 5 is slidingly displaced downward during the compression stroke of the piston rod 8 and that is otherwise closed. The check valve 7 allows the hydraulic oil in the bottom-side oil chamber C to flow through the oil paths 5B toward the rod-side oil chamber B and blocks the reverse flow of hydraulic oil, i.e. from the rod-side oil chamber B toward the bottom-side oil chamber C. The valve opening pressure of the check valve 7 is set lower than the valve opening pressure of the damping force control valve 13 when set to "soft" characteristics. The check valve 7 generates substantially no damping force. The term "the check valve 7 generates substantially no damping force" means that a damping force that the check valve 7 may generate is lower than the friction of the piston 5 and the seal member 10 and has no effect on the movement of the vehicle concerned.

Reference numeral 8 denotes a piston rod axially extending in the inner tube 4. The piston rod 8 has a lower end as one end inserted in the inner tube 4 and secured to the piston 5 by using a nut 8A and so forth. The upper end of the piston rod 8, as the other end, projects to the outside of the outer tube 1 and the inner tube 4 through a rod guide 9 (described later) and the cap member 3. It should be noted that the lower end of the piston rod 8 may be further extended to project outward from a bottom part (e.g. bottom cap 2) to form a double rod cylinder.

Reference numeral 9 denotes a stepped circular cylindrical rod guide provided at the upper end of the inner tube 4. The rod guide 9 positions the upper portion of the inner tube 4 in the center of the outer tube 1 and axially slidably guides the piston rod 8 at the inner peripheral side thereof. An annular seal member 10 is provided between the rod guide 9 and the cap member 3. The seal member 10 comprises a metallic disk provided at the center thereof with a hole through which the piston rod 8 extends, and an elastic material, e.g. a rubber material, secured to the disk by baking. The inner periphery of the seal member 10 slidingly contacts the outer periphery of the piston rod 8 to seal between the seal member 10 and the piston rod 8. The outer periphery of the seal member 10 contacts the cap member 3 to seal therebetween.

The seal member 10 has a lip portion made of a rubber material extending from the lower side thereof so as to contact the rod guide 9, thus also functioning as a check valve. That is, the seal member 10 is disposed between an oil receiving chamber 11 and the reservoir chamber A to allow the hydraulic oil and so forth in the oil receiving chamber 11 to flow toward the reservoir chamber A and to block the reverse flow.

Reference numeral 11 denotes an oil receiving chamber provided between the rod guide 9 and the seal member 10. The oil receiving chamber 11 is formed as an annular space positioned at the outer peripheral side of the piston rod 8 and surrounded by the rod guide 9 and the seal member 10. The oil receiving chamber 11 has the function of receiving hydraulic oil (or gas mixed in the hydraulic oil) leaking from the rod-side oil chamber B through the gap between the piston rod 8 and the rod guide 9 or somewhere else.

Reference numeral 12 denotes an intermediate tube disposed between the outer tube 1 and the inner tube 4. The intermediate tube 12 is installed around the outer periphery of the inner tube 4 with an upper cylindrical seal 12A and a lower cylindrical seal 12B interposed therebetween. The intermediate tube 12 forms therein an annular oil chamber D extending around the outer periphery of the inner tube 4 over the entire circumference of the latter. The annular oil chamber D is independent of the reservoir chamber A. The annular oil chamber D is constantly communicated with the rod-side oil chamber B through the radial oil hole 4A formed in the inner tube 4.

Reference numeral 13 denotes a damping force control valve employed as a damping force generating mechanism in this embodiment. The damping force control valve 13 is disposed as shown in FIG. 1 such that the proximal end thereof is interposed between the reservoir chamber A and the annular oil chamber D and that the distal end of the damping force control valve 13 projects radially outward from a lower part of the outer tube 1. The damping force control valve 13 generates a damping force by controlling the flow of hydraulic oil from the annular oil chamber D toward the reservoir chamber A through a damping valve. The damping force generated by the damping force control valve 13 is variably controlled by adjusting the valve opening pressure of the damping valve with an actuator. That is, the damping force control valve 13 can variably control the damping force generated thereby by changing force axially urging a valve element 13B according to the amount of electric current supplied to a proportional solenoid 13A (actuator).

In this embodiment, the damping force control valve 13 may be any of various types. It is possible to use as the damping force control valve 13 a pressure-controlling valve, a flow rate-controlling valve, or a mechanism controlling the pilot pressure of a pilot control valve but not directly controlling a valve. It is also possible to control extension-side damping force and compression-side damping force independently of each other by further providing a compression-side damping force control valve between the bottom-side oil chamber C and the reservoir chamber A.

Reference numeral 14 denotes a bottom valve as a base valve provided between the bottom cap 2 and the inner tube 4 at the lower end of the inner tube 4. As shown in FIGS. 1 and 2, the bottom valve 14 includes a valve body 15 as a base member secured by being fitted between the upper side of the bottom cap 2 and the lower end of the inner tube 4, a fastening bolt 16 provided to axially extend through the center of the valve body 15 as a fixing shaft, and a combination of a suction valve 17 and a disk valve 18 (described later).

The valve body 15 of the bottom valve 14 is, as shown in FIG. 2, formed in the shape of a lidded cylindrical member of short length. The valve body 15 has annular valve seats 15A and 15B provided on the upper and lower sides thereof, respectively. The valve body 15 is further provided with a plurality of circumferentially spaced oil paths 15C and 15D formed from axial through-holes. The oil paths 15C are disposed radially outward of the oil paths 15D and allow the reservoir chamber A to communicate with the bottom-side oil chamber C when a suction valve 17 (described later) is open.

The valve body 15 secured to the upper side of the bottom cap 2 has a plurality of oil passages 15E on the lower end thereof, which are formed from U-shaped grooves. The oil passages 15E allow a bottom-side space portion E formed between the upper side of the bottom cap 2 and the lower side of the valve body 15 to constantly communicate with the reservoir chamber A.

The fastening bolt 16 has a head portion 16A provided at one axial end thereof and a threaded portion 16B positioned axially opposite the head portion 16A and having an external thread formed on the outer periphery thereof. An accommodating casing 26 (described later) is screwed onto the threaded portion 16B of the fastening bolt 16, thereby fastening a suction valve 17, a disk valve 18, a rod acceleration reducing mechanism 24 (described later), etc. to the bottom valve 14.

The fastening bolt 16 is provided with an oil hole 16C axially extending through the center thereof. The oil hole 16C communicates at the lower end thereof with the reservoir chamber A through the space portion E in the valve body 15. The upper end of the oil hole 16C opens directly into a variable chamber F of the rod acceleration reducing mechanism 24 (described later) and constantly communicates with the variable chamber F.

Reference numeral 17 denotes a suction valve as an extension-side check valve provided on the upper side of the valve body 15. The suction valve 17 is, as shown in FIG. 2, formed by using a disk made of an elastic metal plate. The suction valve 17 is urged in the valve closing direction by a spring 22 (described later). Normally, the suction valve 17 seats on the valve seat 15A of the valve body 15 to close the oil paths 15C.

During the extension stroke of the piston rod 8, however, a pressure difference is produced between the reservoir chamber A and the bottom-side oil chamber C, causing the suction valve 17 to be elastically deformed to open against the spring 22 and to unseat from the valve seat 15A. Consequently, the hydraulic oil in the reservoir chamber A and the space portion E flows toward the bottom-side oil chamber C through the oil paths 15C. Meanwhile, the suction valve 17 is, as shown in FIG. 2, provided with a plurality of through-holes 17A. The through-holes 17A are constantly communicated with the oil paths 15D, respectively, of the valve body 15, thus allowing the hydraulic oil in the bottom-side oil chamber C to flow toward the space portion E and the reservoir chamber A through a disk valve 18 (described later). The suction valve 17 has such characteristics that generate substantially no damping force as in the case of the check valve 7.

Reference numeral 18 denotes a compression-side disk valve 18 provided on the lower side of the valve body 15. As shown in FIG. 2, the disk valve 18 comprises a stack of a plurality of disks made of elastic metal plates and is fixedly installed between the valve seat 15B side of the valve body 15 and the head portion 16A of the fastening bolt 16 with a washer 19 and a retainer 20 interposed therebetween. Of the disks constituting the disk valve 18, the uppermost disk that abuts against the valve seat 15B of the valve body 15 is provided with a cut portion 18A constituting a restriction passage. The cut portion 18A allows the oil paths 15D of the valve body 15 to be constantly communicated with the bottom-side space portion E and the reservoir chamber A.

The disk valve 18 of the bottom valve 14 generates a compression-side damping force by applying a restriction resistance to the hydraulic oil flowing through the cut portion 18A when the hydraulic oil in the bottom-side oil chamber C flows toward the space portion E and the reservoir chamber A through the through-holes 17A of the suction valve 17, the oil paths 15D of the valve body 15 and the cut portion 18A during the compression stroke of the piston rod 8. When the compression speed of the piston rod 8 becomes higher than a predetermined speed, the pressure in the bottom-side oil chamber C further increases, causing the disk valve 18 to be elastically deformed to open. At this time, a damping force corresponding to the compression speed of the piston rod 8 is generated. The retainer 20 limits the maximum degree of opening of the disk valve 18.

Reference numeral 21 denotes an annular retainer limiting the degree of opening of the suction valve 17. The retainer 21 is disposed between a housing 25 (described later) and the suction valve 17 with a spring 22 and so forth interposed therebetween. The spring 22 comprises a weak spring. The retainer 21 is provided with a plurality of through-holes 21A. The through-holes 21A allow the hydraulic oil in the bottom-side oil chamber C (see FIG. 2) to flow between the upper and lower sides of the retainer 21.

The spring 22 is formed as a leaf spring member with a star shape, for example, extending radially from the center thereof. The spring 22 is provided with circumferentially spaced passages (not shown) communicating between the through-holes 21A of the retainer 21 and the through-holes 17A of the suction valve 17. The spring 22 constantly urges the suction valve 17 in the valve closing direction with a relatively weak force.

The outer periphery of the valve body 15 is fitted to the lower end of the inner tube 4 through a stepped cylindrical spacer 23. The spacer 23 allows the lower end of the inner tube 4 to be stably supported by the outer periphery of the valve body 15 and also allows the inner tube 4 to be positioned and centered with respect to the bottom cap 2 and the outer tube 1. The stepped cylindrical spacer 23 also has the function of enhancing sealability between the lower end of the inner tube 4 and the valve body 15 to prevent leakage of hydraulic oil therebetween.

Reference numeral 24 denotes a rod acceleration reducing mechanism employed in this embodiment. The rod acceleration reducing mechanism 24 is disposed in the inner tube 4 at a position closer to the bottom-side oil chamber C and secured to the upper side of the bottom valve 14. The rod acceleration reducing mechanism 24 includes a housing 25, a free piston 28 as a movable partition, and elastic disks 30 and 31, which will be described later.

The rod acceleration reducing mechanism 24 axially slidingly displaces a free piston 28 provided in a housing 25 (described later) in response to pressure changes in the reservoir chamber A and the bottom-side oil chamber C, thereby shaking the piston rod 8 (i.e. causing rod vibration) when the free piston 28 starts and stops moving. The rod vibration generated by the rod acceleration reducing mechanism 24 cancels out vibration of the piston rod 8 (rod vibration) generated in response to opening of the compression-side check valve 7 provided on the piston 5 and rod vibration generated in response to opening of the suction valve 17 provided on the bottom valve 14 as will be explained later, thereby reducing noise (e.g. rapping noise) generated owing to vibration of the piston rod 8 during running of the vehicle.

Reference numeral 25 denotes a cylindrical housing constituting the outer shell of the rod acceleration reducing mechanism 24. The housing 25 is used as a passage member defining variable chambers F and G at vertically opposite sides, respectively, of a free piston 28 (described later). The respective capacities (volumes) of the variable chambers F and G are complementarily varied according to the displacement of the free piston 28. That is, the lower variable chamber F constitutes a passage constantly communicating with the reservoir chamber A through the oil hole 16C of the fastening bolt 16, and the upper variable chamber G constitutes a passage communicating with the bottom-side oil chamber C in the inner tube 4.

The cylindrical housing 25 comprises a cylindrical accommodating casing 26 and a cap 27 (described later). The lower portion of the accommodating casing 26 serves as a nut screwed onto the threaded portion 16B of the fastening bolt 16. The upper side of the accommodating casing 26 is integrally formed with a cylindrical part 26A, a lower end of which is closed. The inner peripheral surface of the cylindrical part 26A forms a piston sliding hole 26B vertically slidably fitted with a free piston 28 (described later).

The accommodating casing 26 has an annular stepped portion 26C formed at a position where the bottom of the cylindrical part 26A is located. An elastic disk 31 (described later) is disposed on the annular stepped portion 26C. A volume-variable chamber F is formed in the accommodating casing 26 between an end portion of the casing 26 closer to the annular stepped portion 26C and the lower end of the free piston 28. The variable chamber F is varied in volume according to the displacement of the free piston 28.

Reference numeral 27 denotes a cap provided by being screwed onto the cylindrical part 26A of the accommodating casing 26 from above. The cap 27 is threadably engaged with the outer periphery of the cylindrical part 26A of the accommodating casing 26 with a free piston 28 (described later) fitted in the cylindrical part 26A, together with the elastic disks 30 and 31. Thus, the cap 27 clamps the upper elastic disk 30 between itself and the free piston 28 to prevent the free piston 28 from coming off and to press, from above, the lower elastic disk 31 against the annular stepped portion 26C of the accommodating casing 26 through the elastic disk 30.

The cap 27 is provided with a communicating hole 27A and an annular projection 27B. The communicating hole 27A allows the variable chamber G between the cap 27 and the free piston 28 to communicate with the bottom-side oil chamber C. The annular projection 27B is formed on the lower side of the cap 27 at a position slightly radially inward of the cylindrical part 26A of the accommodating casing 26. The annular projection 27B abuts against an outer peripheral portion of an elastic disk 30 (described later) from above to position the elastic disk 30 between the annular projection 27B and a projecting portion 28A of the free piston 28 (described later) and to keep the elastic disk 30 in a preset state.

Reference numeral 28 denotes a free piston as a movable partition. The free piston 28 is displaceably provided in the cylindrical part 26A of the accommodating casing 26. As shown in FIG. 2, the free piston 28 is provided with an upward projecting portion 28A and thus formed as a member of convex shape as a whole with the projecting portion 28A. Between the free piston 28 and the housing 25, a volume-variable chamber G is formed around the projecting portion 28A as an annular space.

The projecting portion 28A of the free piston 28 is provided at the upper end thereof with a seat portion 28B formed from an annular projection as a valve element. The upper end of the projecting portion 28A has a portion located radially inward of the seat portion 28B. The portion is formed as a pressure-receiving portion 28C having a flat surface. The pressure-receiving portion 28C receives the pressure in the bottom-side oil chamber C through the communicating hole 27A of the cap 27. The annular seat portion 28B constitutes a limiter that abuts against the lower surface of the cap 27, as shown at the left-hand part of the free piston 28 in FIG. 2, to limit the free piston 28 from being displaced further upwardly. At this time, the seat portion 28B also functions as a valve element that cuts off the variable chamber G in the housing 25 from the communicating hole 27A (i.e. the bottom-side oil chamber C).

The free piston 28 has on the lower side thereof a circular boss portion 28D and a flat annular surface 28E surrounding the boss portion 28D. The boss portion 28D abuts against the upper surface of an elastic disk 31 (described later) as shown at the right-hand part of the free piston 28 in FIG. 2. When the free piston 28 is displaced downward in the housing 25 (in the piston sliding hole 26B of the accommodating casing 26), the boss portion 28D deflects the elastic disk 31, and in this state, the annular surface 28E is supported by the annular stepped portion 26C of the accommodating casing 26 through the elastic disk 31. In this way, the downward displacement of the free piston 28 is limited. Thus, the annular surface 28E constitutes a displacement limiter.

Further, the free piston 28 has an orifice 28F formed as an axially extending oil path with a small diameter that communicates between the upper variable chamber G and the lower variable chamber F. The orifice 28F generates a pressure difference between the variable chambers F and G during the extension stroke and compression stroke of the piston rod 8.

When the piston rod 8 is not displaced (moved), the orifice 28F allows hydraulic oil to flow therethrough so that there is no pressure difference between the variable chambers F and G. The speed of the free piston 28 when it is slidingly displaced in the housing 25 (i.e. the piston sliding hole 26B of the accommodating casing 26) is also adjusted by the bore diameter and flow path area of the orifice 28F.

The free piston 28 has an O-ring 29 as a seal member provided around the outer periphery thereof. The O-ring 29 seals between the cylindrical part 26A of the accommodating casing 26 and the free piston 28 to cut off communication between the upper variable chamber G and the lower variable chamber F, except through the orifice 28F.

An elastic disk 30 formed from a leaf spring as an elastic member is provided between the upper end of the free piston 28 and the housing 25. An elastic disk 31 formed from a leaf spring as an elastic member is provided between the lower end of the free piston 28 and the housing 25. The elastic disks 30 and 31 urge the free piston 28 in opposite directions to each other. When the displacement of the piston 5 in the inner tube 4 is stopped, the free piston 28 is displaceably held in the housing 25 by the elastic disks 30 and 31.

The elastic disks 30 and 31 have the function of applying an elastic resistance to the movement of the free piston 28 when it is slidingly displaced axially, i.e. vertically, in the piston sliding hole 26B of the accommodating casing 26 by a pressure difference between the reservoir chamber A and the bottom-side oil chamber C (i.e. between the variable chambers F and G), and of adjusting the movement timing of the free piston 28 according to the amount of deformation of the elastic disks 30 and 31.

The upper elastic disk 30 is provided between the projecting portion 28A of the free piston 28 and the annular projection 27B of the cap 27. The free piston 28 is disposed between the upper elastic disk 30 and the lower elastic disk 31 in such a manner as to be held from the upper and lower sides thereof by the upper and lower elastic disks 30 and 31. The elastic disks 30 and 31 constantly urge the free piston 28 in opposite directions to each other to return to the initial position shown at the right-hand part of the free piston 28 in FIG. 2.

When the pressure in the bottom-side oil chamber C becomes lower than that in the reservoir chamber A during the extension stroke of the piston rod 8, for example, the free piston 28 is displaced upward against the elastic disk 30 by a pressure difference between the variable chambers F and G. At this time, the elastic disk 30 is elastically deflected between the outer periphery of the projecting portion 28A and the annular projection 27B of the cap 27 as shown at the left-hand part of the free piston 28 in FIG. 2. Then, the seat portion 28B of the free piston 28 abuts against the lower surface of the cap 27, thereby limiting the free piston 28 from being displaced further.

The lower elastic disk 31 is disposed between the annular stepped portion 26C of the accommodating casing 26 and the boss portion 28D of the free piston 28 and comprises a plurality of disks stacked one on top of another and clamped at the inner peripheral side of the disk stack. When the pressure in the bottom-side oil chamber C becomes higher than that in the reservoir chamber A during the compression stroke of the piston rod 8, the free piston 28 is displaced downward against the elastic disk 31 by a pressure difference between the variable chambers F and G. At this time, the elastic disk 31 is elastically deflected between the boss portion 28D of the free piston 28 and the annular stepped portion 26C of the accommodating casing 26. Then, the annular surface 28E of the free piston 28 abuts against an outer peripheral portion of the upper surface of the elastic disk 31, thereby limiting the free piston 28 from being displaced further.

As shown in FIG. 1, a mounting member 32 is secured to the lower side of the bottom cap 2 by welding or other securing method. The mounting member 32 constitutes a mounting bracket attached to a wheel-side member of a vehicle, for example.

The hydraulic shock absorber according to the first embodiment has the above-described structure. The following is an explanation of the assembling procedure of the bottom valve 14 and the rod acceleration reducing mechanism 24, which are provided at the lower end of the inner tube 4.

First, to assemble the bottom valve 14, the threaded portion 16B of the fastening bolt 16 is inserted through the center of the valve body 15. Then, the disk valve 18, the washer 19 and the retainer 20 are clamped between the valve seat 15B of the valve body 15 and the head portion 16A of the fastening bolt 16 from axially opposite sides. Onto the threaded portion 16B of the fastening bolt 16 extending through the valve body 15 and projecting upward, the suction valve 17, the spring 22, the retainer 21, and so forth are successively fitted downwardly.

Next, the lower portion of the accommodating casing 26 is threadably engaged with the threaded portion 16B of the fastening bolt 16, which has the suction valve 17, the spring 22, the retainer 21, and so forth fitted thereon as stated above, and the accommodating casing 26 is fastened. Thus, the suction valve 17 is clamped between the valve seat 15A of the valve body 15 and the retainer 21 with the spring 22 and so forth interposed therebetween. Next, the free piston 28, together with the elastic disks 30 and 31, is fitted into the upwardly projecting cylindrical part 26A of the accommodating casing 26 fastened to the threaded portion 16B of the fastening bolt 16.

Next, the cap 27 is screwed onto the outer periphery of the cylindrical part 26A, which has the free piston 28 and the elastic disks 30 and 31 fitted therein. Thus, the cap 27 has the lower end of the annular projection 27B abutting against the outer peripheral portion of the upper elastic disk 30, thereby pressing, from above, the lower elastic disk 31 against the annular stepped portion 26C of the accommodating casing 26, together with the free piston 28. In addition, the upper elastic disk 30 is clamped between the cap 27 and the free piston 28, thus preventing the free piston 28 from coming off.

With the bottom valve 14 and the rod acceleration reducing mechanism 24 assembled together into one unit as stated above, the outer periphery of the valve body 15 is fitted and secured to the inner periphery of the lower end of the inner tube 4 with a stepped cylindrical spacer 23 interposed therebetween as shown in FIG. 2. Thus, the rod acceleration reducing mechanism 24 is disposed in such a way as to be fitted in the inner tube 4. Next, as shown in FIG. 2, the valve body 15 of the bottom valve 14 is fitted into the bottom cap 2, and the inner tube 4 is secured in the outer tube 1. Thus, an annular reservoir chamber A is formed between the outer tube 1 and the inner tube 4. In addition, the interior of the inner tube 4 is divided by the piston 5 to define a rod-side oil chamber B and a bottom-side oil chamber C, as shown in FIG. 1.

Next, the hydraulic shock absorber assembled as stated above is attached to a vehicle such that the upper end of the piston rod 8 is secured to a vehicle body-side member and that the mounting member 32 (see FIG. 1), which is provided at the bottom cap 2-side end of the shock absorber, is secured to a wheel-side member. During running of the vehicle, when vertical vibrations are caused by unevenness on the road surface, the piston rod 8 is displaced to extend from and withdraw into the outer tube 1. Consequently, damping forces can be generated by the damping force control valve 13 provided on the outer tube 1, the disk valve 18 of the bottom valve 14, and so forth. Thus, the vibrations of the vehicle can be absorbed.

More specifically, during the extension stroke of the piston rod 8, the hydraulic oil in the rod-side oil chamber B flows from the annular oil chamber D toward the damping force control valve 13 through the oil hole 4A. The damping force control valve 13 can variably adjust the damping force during the extension stroke of the piston rod 8 by controlling the flow of hydraulic oil between the reservoir chamber A and the annular oil chamber D so as to allow or cut off the flow of hydraulic oil and also variably controlling the flow path area.

At this time, the piston rod 8 is displaced to exit outward from the inner tube 4. Therefore, the bottom-side oil chamber C in the inner tube 4 becomes lower in pressure than the bottom-side space portion E and the reservoir chamber A. Consequently, the hydraulic oil in the reservoir chamber A flows from the space portion E into the bottom-side oil chamber C through the suction valve 17 of the bottom valve 14 to compensate for a volumetric change in the bottom-side oil chamber C corresponding to the volume of the piston rod 8 exiting the inner tube 4.

During the compression stroke of the piston rod 8, the piston rod 8 enters the inner tube 4, and the pressure in the bottom-side oil chamber C becomes higher than that in the rod-side oil chamber B. Consequently, the check valve 7 provided on the piston 5 opens, and the hydraulic oil in the bottom-side oil chamber C flows into the rod-side oil chamber B through the oil paths 5B. Between the reservoir chamber A and the annular oil chamber D also, hydraulic oil flows through the damping force control valve 13. Therefore, during the compression stroke of the piston rod 8 also, damping force can be variably adjusted by the damping force control valve 13.

At this time, an amount of hydraulic oil corresponding to the volume of the piston rod 8 entering the inner tube 4 flows from the bottom-side oil chamber C into the reservoir chamber A through the disk valve 18 of the bottom valve 14. Accordingly, the amount of hydraulic oil in the reservoir chamber A increases corresponding to the volume of the piston rod 8 entering the inner tube 4. Thus, the hydraulic oil in the reservoir chamber A compresses the gas therein to compensate for a volumetric change corresponding to the volume of the piston rod 8 entering the inner tube 4. The disk valve 18 of the bottom valve 14 can generate a compression-side damping force when the hydraulic oil in the bottom-side oil chamber C flows therethrough toward the bottom-side space portion E and the reservoir chamber A.

Regarding the hydraulic shock absorber having the bottom valve 14, the suction valve 17 of the bottom valve 14 opens when the piston rod 8 reverses the stroke direction from the compression stroke to the extension stroke. As the suction valve 17 opens, the hydraulic oil in the reservoir chamber A flows from the bottom-side space portion E toward the bottom-side oil chamber C. Consequently, the pressure in the bottom-side oil chamber C in the inner tube 4 changes rapidly, which is likely to cause vibration of the piston rod 8, and this causes generation of noise known as rapping noise.

When the piston rod 8 reverses the stroke direction from the extension stroke to the compression stroke, the compression-side check valve 7 provided on the piston 5 opens. As the compression-side check valve 7 opens, the hydraulic oil in the bottom-side oil chamber C flows toward the rod-side oil chamber B through the oil paths 5B of the piston 5. Consequently, the pressures in the rod-side oil chamber B and the bottom-side oil chamber C in the inner tube 4 change rapidly, which is likely to cause vibration of the piston rod 8, and this causes generation of noise known as rapping noise.

Therefore, in the first embodiment, the rod acceleration reducing mechanism 24 is provided in the bottom-side oil chamber C in the inner tube 4, and the free piston 28 provided in the accommodating casing 26 of the rod acceleration reducing mechanism 24 is axially slidingly displaced in response to pressure changes in the reservoir chamber A and the bottom-side oil chamber C, thereby shaking the piston rod 8, i.e. causing rod vibration, when the free piston 28 starts to move (displacement start point) and stops moving (displacement stop point).

The rod vibration generated by the rod acceleration reducing mechanism 24 can cancel out vibration of the piston rod 8 (rod vibration) generated in response to opening of the compression-side check valve 7 provided on the piston 5 and rod vibration generated in response to opening of the suction valve 17 provided on the bottom valve 14, as will be explained below. Consequently, the generation of noise known as rapping noise can be reduced.

[Extension Stroke to Compression Stroke]

When the piston rod 8 reverses the stroke direction from the extension stroke to the compression stroke, the pressure in the bottom-side oil chamber C increases from a level slightly lower than the pressure in the reservoir chamber A.

That is, when the resultant force composed of the force of pressure in the bottom-side oil chamber C that the pressure-receiving portion 28C receives and the downward force applied to the free piston 28 from the elastic disk 30 is smaller than the force of pressure in the reservoir chamber A that the free piston 28 receives at the variable chamber F side, the free piston 28 is at rest with the seat portion 28B thereof abutting against the lower surface of the cap 27 as shown at the left-hand part of the free piston 28 in FIG. 2, and the elastic disk 30 remains elastically deflected.

However, the free piston 28 starts to move so as to be displaced downward in the piston sliding hole 26B of the accommodating casing 26 when the pressure in the bottom-side oil chamber C increases as the compression stroke of the piston rod 8 progresses and, eventually, the resultant force composed of the force of pressure in the bottom-side oil chamber C that the pressure-receiving portion 28C of the free piston 28 receives and the urging force of the elastic disk 30 becomes larger than the force of pressure in the reservoir chamber A that the free piston 28 receives at the variable chamber F side. The start point of movement of the free piston 28 is the displacement start point, at which the seat portion 28B separates from the lower surface of the cap 27.

When the downward movement of the free piston 28 is started, the variable chamber G located above the free piston 28 is increased in volume in the housing 25 of the rod acceleration reducing mechanism 24. Consequently, the bottom-side oil chamber C, which communicates with the variable chamber G through the communicating hole 27A of the cap 27, is given a pressure change in the direction for suppressing the pressure increase corresponding to the increase in volume of the variable chamber G. Accordingly, the rod acceleration reducing mechanism 24 can generate such rod vibration that shakes the piston rod 8 downward (in the compression direction).

Thereafter, when the pressure in the bottom-side oil chamber C further increases as the compression stroke of the piston rod 8 further progresses, the free piston 28 is displaced downward in the piston sliding hole 26B of the accommodating casing 26 as far as the stroke end, and the boss portion 28D of the free piston 28 deflects the elastic disk 31 downward. Meanwhile, the annular surface 28E of the free piston 28 is supported by the annular stepped portion 26C of the accommodating casing 26 through the elastic disk 31, thereby limiting the free piston 28 from being displaced further downwardly. Thus, the free piston 28 comes to a halt.

In this way, the free piston 28 is stopped from moving downward in the piston sliding hole 26B of the accommodating casing 26. The stop point of movement of the free piston 28 is the displacement stop point, at which the rod acceleration reducing mechanism 24 stops the volume of the variable chamber G from increasing further. Consequently, the bottom-side oil chamber C, which communicates with the variable chamber G through the communicating hole 27A of the cap 27, is given a pressure change in the direction for accelerating the increase in pressure. Accordingly, the rod acceleration reducing mechanism 24 can generate such rod vibration that shakes the piston rod 8 upward (in the extension direction).

During the compression stroke of the piston rod 8, on the other hand, a pressure difference is produced between the rod-side oil chamber B and the bottom-side oil chamber C as the piston 5 is slidingly displaced, which causes the compression-side check valve 7 provided on the piston 5 to open. When the compression-side check valve 7 opens, a pressure change occurs in the direction for temporarily suppressing the pressure increase in the bottom-side oil chamber C, and such rod vibration is generated that shakes the piston rod 8 downward (in the compression direction).

Therefore, the rod vibration generated in response to opening of the compression-side check valve 7 to shake the piston rod 8 downward (in the compression direction) and the rod vibration generated by the rod acceleration reducing mechanism 24 to shake the piston rod 8 upward (in the extension direction) are adjusted in timing to coincide with each other. By so doing, the rod vibrations, which are mutually opposite in direction, can be canceled out by each other. As a result, it is possible to reduce the generation of noise known as rapping noise in the hydraulic shock absorber.

The rod vibrations can also be canceled out by each other by adjusting the timing of the two rod vibrations so that the rod vibration generated in response to opening of the check valve 7 is one-half cycle behind the rod vibration that shakes the piston rod 8 downward (in the compression direction) at the above-described displacement start point of the rod acceleration reducing mechanism 24. In this way also, the generation of noise known as rapping noise can be reduced.

[Compression Stroke to Extension Stroke]

When the piston rod 8 reverses the stroke direction from the compression stroke to the extension stroke, the pressure in the bottom-side oil chamber C reduces from a level slightly higher than the pressure in the reservoir chamber A.

That is, the free piston 28 is at rest when the resultant force composed of the force of pressure in the reservoir chamber A that the lower side (the boss portion 28D and the annular surface 28E) of the free piston 28 receives at the variable chamber F side and the upward urging force of the elastic disk 31 is smaller than the force of pressure in the bottom-side oil chamber C that the free piston 28 receives at the pressure-receiving portion 28C. At this time, the free piston 28 is at rest in a state where the boss portion 28D of the free piston 28 elastically deflects the elastic disk 31, and the annular surface 28E is supported by the annular stepped portion 26C of the accommodating casing 26 through the elastic disk 31 (i.e. the downward displacement of the free piston 28 is limited).

However, the free piston 28 starts to move so as to be displaced upward in the piston sliding hole 26B of the accommodating casing 26 when the resultant force composed of the force of pressure in the reservoir chamber A that the boss portion 28D and the annular surface 28E of the free piston 28 receive at the variable chamber F side and the upward urging force of the elastic disk 31 becomes larger than the force of pressure in the bottom-side oil chamber C that the free piston 28 receives at the pressure-receiving portion 28C. The start point of movement of the free piston 28 is the displacement start point, at which the annular surface 28E, for example, starts to separate upward from the annular stepped portion 26C of the accommodating casing 26 through the elastic disk 31.

When the upward movement of the free piston 28 is started, the variable chamber G, which is located above the free piston 28, is reduced in volume in the housing 25 of the rod acceleration reducing mechanism 24. Consequently, the bottom-side oil chamber C, which communicates with the variable chamber G through the communicating hole 27A of the cap 27, is given a pressure change in the direction for suppressing the pressure reduction corresponding to the reduction in volume of the variable chamber G. Accordingly, the rod acceleration reducing mechanism 24 can generate such rod vibration that shakes the piston rod 8 upward (in the extension direction).

Thereafter, when the pressure in the bottom-side oil chamber C further reduces as the extension stroke of the piston rod 8 further progresses, the free piston 28 is displaced upward in the piston sliding hole 26B of the accommodating casing 26 as far as the stroke end, and the seat portion 28B of the free piston 28 abuts against the lower surface of the cap 27 as shown at the left-hand part of the free piston 28 in FIG. 2. Thus, the free piston 28 is limited from being displaced further upwardly and stops the movement.

In this way, the free piston 28 is stopped from moving upward in the piston sliding hole 26B of the accommodating casing 26. The stop point of movement of the free piston 28 is the displacement stop point, at which the rod acceleration reducing mechanism 24 stops the volume of the variable chamber G from reducing further. Consequently, the bottom-side oil chamber C, which communicates with the variable chamber G through the communicating hole 27A of the cap 27, is given a pressure change in the direction for accelerating the reduction in pressure. Accordingly, the rod acceleration reducing mechanism 24 can generate such rod vibration that shakes the piston rod 8 downward (in the compression direction).

During the extension stroke of the piston rod 8, on the other hand, a pressure difference is produced between the bottom-side oil chamber C in the inner tube 4 and the reservoir chamber A outside the inner tube 4 as the piston 5 is slidingly displaced, which causes the suction valve 17 (extension-side check valve) provided in the bottom valve 14 to open. When the suction valve 17 opens, a pressure change occurs in the direction for temporarily suppressing the pressure reduction in the bottom-side oil chamber C, and such rod vibration is generated that shakes the piston rod 8 upward (in the extension direction).

Therefore, the rod vibration generated in response to opening of the suction valve 17 to shake the piston rod 8 upward (in the extension direction) and the rod vibration caused by the rod acceleration reducing mechanism 24 to shake the piston rod 8 downward (in the compression direction) are adjusted in timing to coincide with each other. By so doing, the rod vibrations, which are mutually opposite in direction, can be canceled out by each other. As a result, it is possible to reduce the generation of noise known as rapping noise in the hydraulic shock absorber.

The rod vibrations can also be canceled out by each other by adjusting the two rod vibrations in timing so that the rod vibration generated in response to opening of the suction valve 17 is one-half cycle behind the rod vibration that shakes the piston rod 8 upward (in the extension direction) at the above-described displacement start point of the rod acceleration reducing mechanism 24. In this way also, the generation of noise known as rapping noise can be reduced.

[Regarding Parameters for Timing Adjustment]

When the piston rod 8 reverses the stroke direction from the extension stroke to the compression stroke, for example, the free piston 28 is at rest (stationary) with the seat portion 28B abutting against the lower surface of the cap 27 in a negative pressure state where the pressure in the bottom-side oil chamber C is slightly lower than that in the reservoir chamber A, as has been stated above. Therefore, at substantially the same time as the extension stroke changes to the compression stroke, the free piston 28 reaches the displacement start point and starts to move at a timing earlier than opening of the compression-side check valve 7 on the piston 5.

In this regard, the diameter of the seat portion 28B of the free piston 28 (i.e. the pressure-receiving area of the pressure-receiving portion 28C) is made smaller than the diameter of the lower surface of the free piston 28 (i.e. the pressure-receiving area of the variable chamber F-side surface of the free piston 28). Consequently, it is possible to retard the displacement start point at which the seat portion 28B of the free piston 28 starts to separate from the lower surface of the cap 27, and the timing of generation of rod vibration by the rod acceleration reducing mechanism 24 can be synchronized with the valve opening timing of the compression-side check valve 7. The timing adjustment can also be made by using the piston sliding hole 26B and so forth.

After the free piston 28 has started displacement, the free piston 28 receives the pressure in the bottom-side oil chamber C with a large pressure-receiving area at the variable chamber G-side thereof. Therefore, there is no fear of interfering with the function of the rod acceleration reducing mechanism 24 over the entire operation of the piston rod 8 from the compression stroke to the extension stroke.

Thus, according to the first embodiment, the rod acceleration reducing mechanism 24 is provided in the bottom-side oil chamber C of the inner tube 4. The rod acceleration reducing mechanism 24 includes a housing 25 comprising a cylindrical accommodating casing 26 screwed onto the fastening bolt 16 of the bottom valve 14 and a cap 27. The rod acceleration reducing mechanism 24 further includes a free piston 28 displaceably fitted in the housing 25 to define an upper variable chamber G and a lower variable chamber F. Further, the rod acceleration reducing mechanism 24 includes elastic disks 30 and 31 applying an elastic resistance to the displacement of the free piston 28.

The variable chambers G and F formed in the housing 25 are variable in volume in response to pressure changes in the bottom-side oil chamber C and the reservoir chamber A, and a pressure-receiving area over which the free piston 28 in the housing 25 receives the pressure in the bottom-side oil chamber C is allowed to change when the free piston 28 starts to move (displacement start point) and stops moving (displacement stop point). With this arrangement, the piston rod 8 can be shaken to generate rod vibration at the displacement start point and displacement stop point of the free piston 28.

As a result, it is possible to cancel out rod vibration generated in response to opening of the suction valve 17 of the bottom valve 14 when the piston rod 8 reverses the stroke direction from the compression stroke to the extension stroke and vibration (rod vibration) of the piston rod 8 generated in response to opening of the compression-side check valve 7 of the piston 5 when the piston rod 8 reverses the stroke direction from the extension stroke to the compression stroke by using rod vibration generated by the rod acceleration reducing mechanism 24. Consequently, the generation of noise known as rapping noise can be reduced.

Before the check valve 7 opens, the rod acceleration reducing mechanism 24 operates to compensate for the flow rate through the check valve 7. Before the suction valve 17 opens, the rod acceleration reducing mechanism 24 operates to compensate for the flow rate through the suction valve 17. Thus, it is possible to suppress rod vibration caused by a rapid pressure change.

Figure 3:
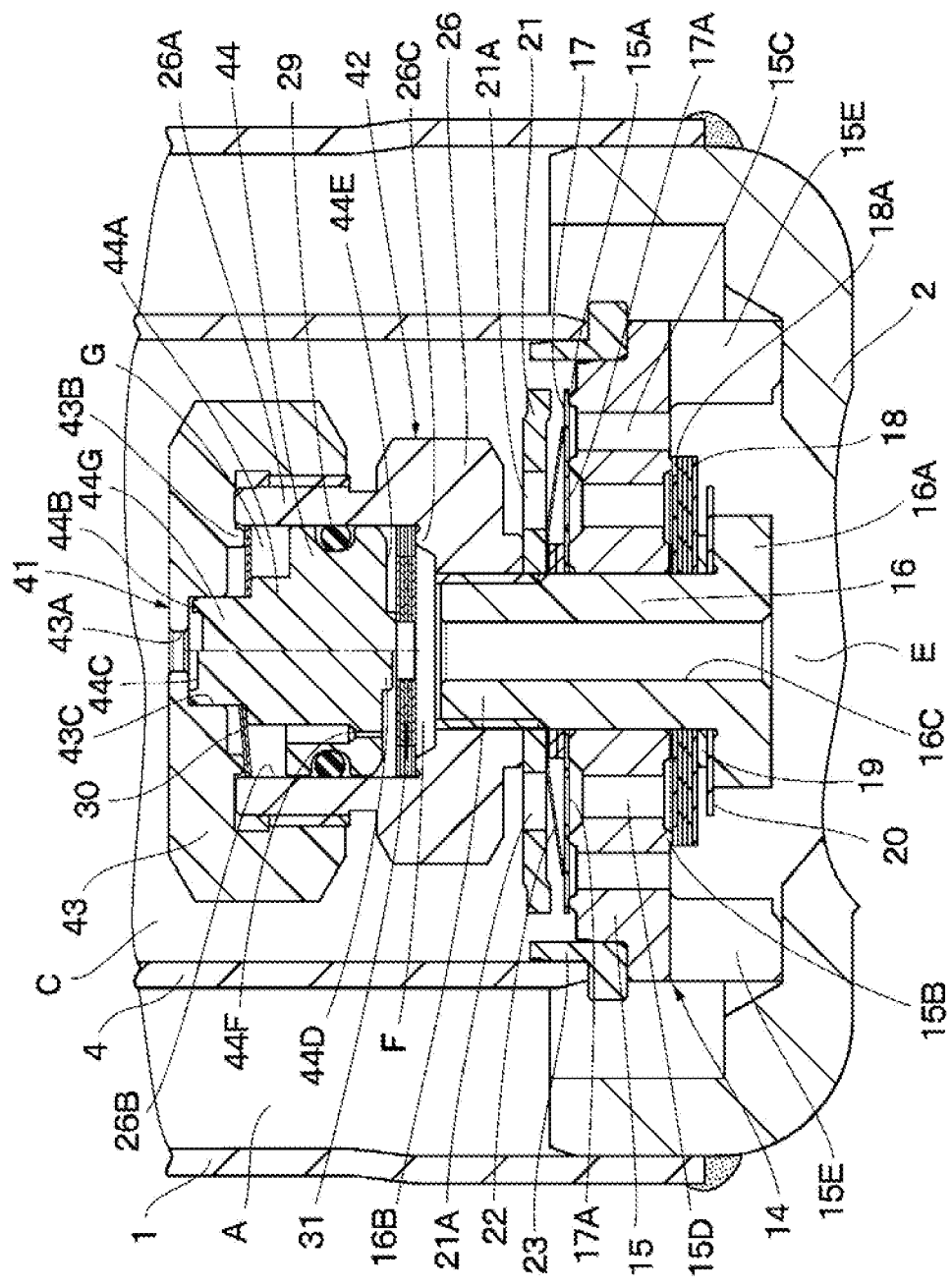
FIG. 3 is a fragmentary enlarged sectional view similar to FIG. 2, showing a rod acceleration reducing mechanism according to a second embodiment of the present invention, in which the left-hand part of a free piston shows the free piston as displaced upward, and the right-hand part thereof shows the free piston as displaced downward.

FIG. 3 shows a second embodiment of the present invention. The feature of the second embodiment resides in that a pressure-receiving area over which the partition receives the pressure in the bottom-side oil chamber is kept constant before and after the movement of the partition is limited by the limiter. It should be noted that in the second embodiment the same constituent elements as those of the foregoing first embodiment are denoted by the same reference numerals as used in the first embodiment, and a description thereof is omitted.

In the figure, reference numeral 41 denotes a rod acceleration reducing mechanism employed in the second embodiment. As in the case of the rod acceleration reducing mechanism 24 described in the first embodiment, the rod acceleration reducing mechanism 41 includes a housing 42 comprising a cylindrical accommodating casing 26 screwed onto the fastening bolt 16 of the bottom valve 14, and a cap 43 (described later). The rod acceleration reducing mechanism 41 further includes a free piston 44 displaceably provided in the housing 42 as a partition, and elastic disks 30 and 31.

Reference numeral 42 denotes a cylindrical housing employed in the second embodiment. The housing 42 comprises a cylindrical accommodating casing 26 and a cap 43 in the same way as the housing 25 described in the first embodiment. The second embodiment differs from the first embodiment in that the cap 43 of the housing 42 has a spool guide hole 43C formed as follows.

The cap 43 is provided with a communicating hole 43A and an annular projection 43B in the same way as the cap 27 described in the first embodiment. The cap 43, however, has a spool guide hole 43C in the shape of a cylinder, an upper end of which is closed. The spool guide hole 43C is formed at a position radially inward of the annular projection 43B. The communicating hole 43A is provided in the center of the closed end of the spool guide hole 43C. The communicating hole 43A allows the spool guide hole 43C to constantly communicate with the variable chamber G.

Reference numeral 44 denotes a free piston employed in this embodiment as a movable partition. The free piston 44 is provided with a projecting portion 44A, an annular seat portion 44B, a pressure-receiving portion 44C, a circular boss portion 44D, an annular surface 44E, and an orifice 44F in the same way as the free piston 28 described in the first embodiment. However, the free piston 44 in this embodiment differs from the free piston 28 in the first embodiment in that the free piston 44 has a boss-shaped spool portion 44G.

That is, the spool portion 44G of the free piston 44 is provided to project upward from the projecting portion 44A and slidably fitted in the spool guide hole 43C of the cap 43. Between the free piston 44 and the housing 42, a variable chamber G is formed as a stepped annular space. The variable chamber G is located around the outer peripheries of the projecting portion 44A and the spool portion 44G.

The seat portion 44B of the free piston 44 is formed as an annular projection provided on the upper end of the spool portion 44G. A portion located radially inward of the seat portion 44B is formed as a pressure-receiving portion 44C having a flat surface. When receiving, at the pressure-receiving portion 44C, the pressure in the bottom-side oil chamber C through the communicating hole 43A of the cap 43, the free piston 44 is slidingly displaced toward the variable chamber F (downward) against the urging force of the elastic disk 31, for example. Even at this time, the spool portion 44G is kept fitted in the spool guide hole 43C of the cap 43.

Thus, the second embodiment arranged as stated above can also obtain advantageous effects substantially similar to those in the foregoing first embodiment. Particularly, in the second embodiment, the free piston 44 is provided with a spool portion 44G projecting upward from the projecting portion 44A. The spool portion 44G is slidably fitted in the spool guide hole 43C of the cap 43 and kept fitted in the spool guide hole 43C of the cap 43 even when the free piston 44 is slidingly displaced toward the variable chamber F (downward).

Accordingly, a pressure-receiving area over which the pressure-receiving portion 44C of the free piston 44 receives the pressure in the bottom-side oil chamber C can be kept constant without changing over the entire operation from the extension stroke to the compression stroke. Consequently, it is possible to keep substantially constant the force of pressure in the bottom-side oil chamber C that presses the free piston 44 from the variable chamber G side toward the variable chamber F, and possible to slow down the displacement speed of the free piston 44.

Accordingly, the timing at which the annular surface 44E of the free piston 44 is supported by the annular stepped portion 26C of the accommodating casing 26 through the elastic disk 31 and the displacement of the free piston 28 is limited and stopped can be retarded more than in the first embodiment. For the same reason, it is possible to reduce the magnitude of rod vibration when the displacement of the free piston 44 toward the reservoir chamber A is limited and stopped.

Figure 4:
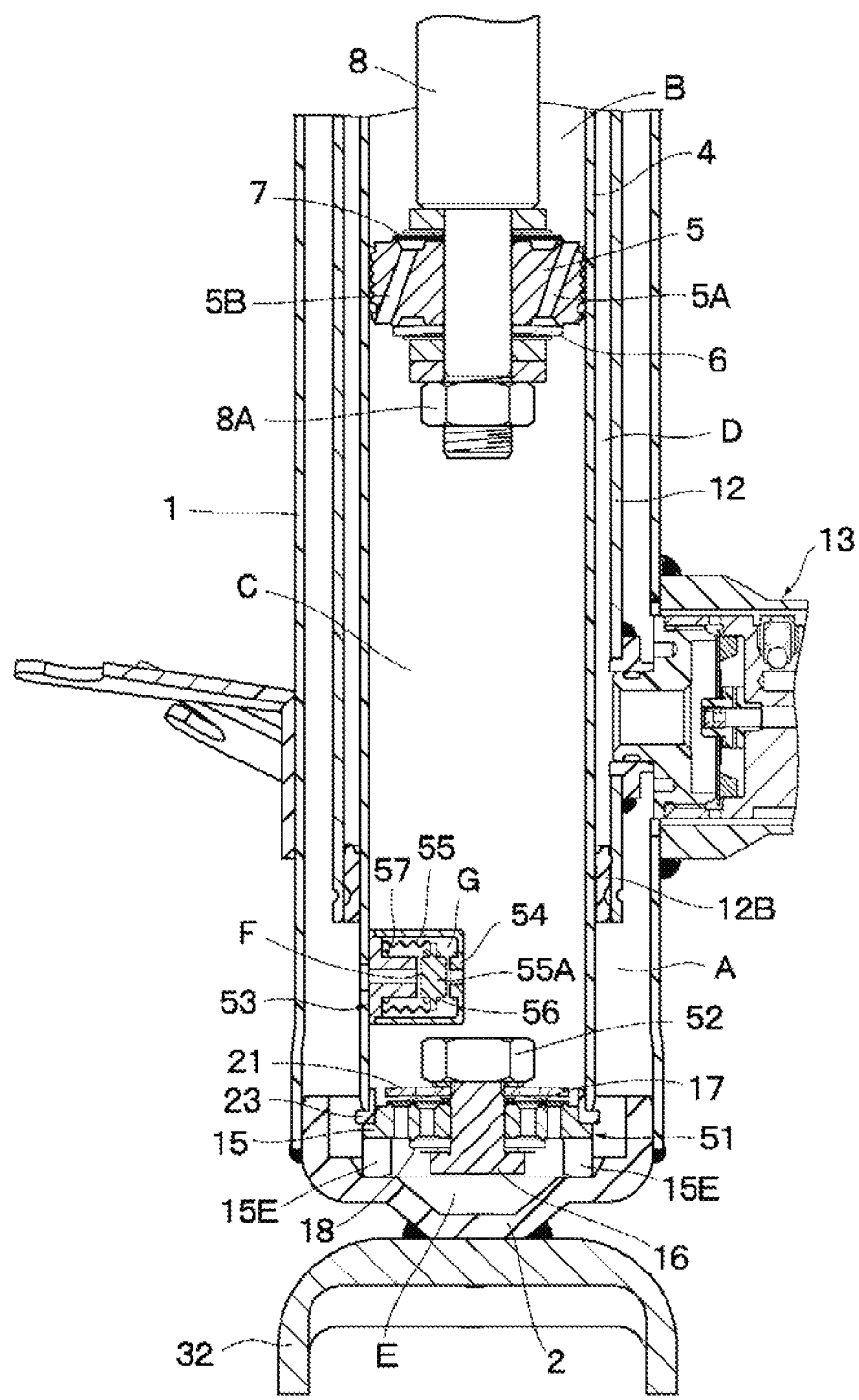
FIG. 4 is a fragmentary sectional view showing a hydraulic shock absorber provided with a rod acceleration reducing mechanism according to a third embodiment of the present invention.

FIG. 4 shows a third embodiment of the present invention. The feature of the third embodiment resides in that the partition displaceably provided in the passage member of the rod acceleration reducing mechanism is formed from a bellows. It should be noted that in the third embodiment the same constituent elements as those of the foregoing first embodiment are denoted by the same reference numerals as used in the first embodiment, and a description thereof is omitted.

In the figure, reference numeral 51 denotes a bottom valve employed in the third embodiment as a base valve. The bottom valve 51 includes a valve body 15, a solid fastening bolt 16, a suction valve 17, and a disk valve 18 in the same way as the bottom valve 14 described in the first embodiment. In the bottom valve 51 of the third embodiment, however, a nut 52 is screwed onto the fastening bolt 16 to fasten the suction valve 17, the disk valve 18, the retainer 21, etc. to the valve body 15.

Reference numeral 53 denotes a rod acceleration reducing mechanism employed in this embodiment. The rod acceleration reducing mechanism 53 includes a housing 54 secured to the inner periphery of a lower part of the inner tube 4 to constitute a cylindrical passage member, a bellows 55 displaceably provided in the housing 54 as a movable partition, and springs 56 and 57 as urging members urging the bellows 55 in opposite directions to each other.

The bellows 55 as a movable partition is formed by using a metallic bellows, for example, and provided in the center thereof with a valve element 55A in the shape of a disk having a predetermined plate thickness. The interior of the housing 54 is divided by the bellows 55 to define a volume-variable chamber F communicating with the reservoir chamber A and a volume-variable chamber G communicating with the bottom-side oil chamber C.

When the valve element 55A of the bellows 55 is displaced toward the variable chamber G (bottom-side oil chamber C) against the spring 56, the movement of the valve element 55A is limited and stopped at one stroke end, and the valve element 55A cuts off communication between the variable chamber G and the bottom-side oil chamber C. When the valve element 55A of the bellows 55 is displaced toward the variable chamber F (reservoir chamber A) against the spring 57, the movement of the valve element 55A is limited and stopped at the other stroke end, and the valve element 55A cuts off communication between the variable chamber F and the reservoir chamber A.

Thus, the third embodiment arranged as stated above can also obtain advantageous effects substantially similar to those in the foregoing first embodiment by activating the rod acceleration reducing mechanism 53 when a pressure difference is generated between the reservoir chamber A and the bottom-side oil chamber C in the same way as in the first embodiment. In the third embodiment, further, the rod acceleration reducing mechanism 53 can be simplified in structure and reduced in size by using the bellows 55 as a movable partition.

It should be noted that, in the foregoing first embodiment, the seal member provided around the outer periphery of the free piston 28 is the O-ring 29, by way of example. However, the present invention is not limited to the use of the O-ring 29. For example, the seal member may be a belt-shaped ring made of a resin material, e.g. fluorocarbon resin (polytetrafluoroethylene).

In the foregoing embodiments, the present invention has been described by taking a hydraulic shock absorber as an example of a shock absorber provided in an automobile or other vehicle. However, the present invention is not limited thereto but may also be applied, for example, to shock absorbers for use in various machines, architectural structures, etc. which constitute vibration sources.

Although in the foregoing embodiments, the reservoir chamber is provided around the outer periphery of the inner tube, by way of example, the present invention is not limited thereto. The reservoir chamber may be provided as a discrete structure. Alternatively, the reservoir chamber may be provided below the bottom valve.

In the foregoing embodiments, the present invention has been described by taking, as an example, a shock absorber capable of controlling damping force with an actuator. However, the present invention is not limited thereto but may also be applied, for example, to a fixed damping force type shock absorber.

As has been stated above, according to the foregoing embodiments, a passage member is formed from a cylindrical housing displaceably accommodating a partition, and the partition has a valve element cutting off communication between the bottom-side chamber and the interior of the housing when the movement of the partition is limited by a limiter. Accordingly, when the partition moves within the cylindrical housing, the movement of the partition can be limited by the limiter, and when the movement of the partition is limited, communication between the bottom-side chamber and the interior of the housing can be cut off by the valve element.

Further, according to the foregoing embodiments, the housing is provided with a communicating hole allowing communication between the bottom-side chamber and the variable chamber, and the partition is a free piston slidingly displaceable in the housing. The free piston cuts off communication between the bottom-side chamber and the variable chamber through the communicating hole by the valve element. Accordingly, when the free piston moves within the housing, the movement of the free piston can be limited by the limiter, and when the movement of the free piston is limited, communication between the bottom-side chamber and the variable chamber in the housing can be cut off by the valve element.

Further, according to the foregoing embodiments, a pressure-receiving area over which the partition receives the pressure in the bottom-side chamber is larger before than after the movement of the partition is limited by the limiter. Accordingly, when the movement of the partition is limited by the limiter, the pressure-receiving area over which the partition receives the pressure in the bottom-side chamber can be reduced, and before the movement of the partition is limited by the limiter, the pressure-receiving area over which the partition receives the pressure in the bottom-side chamber can be increased.

Further, according to the foregoing embodiments, the shock absorber has another urging member urging the partition toward the bottom-side chamber, and when the displacement of the piston in the cylinder is at rest, the partition is displaceably urged in mutually opposite directions by the two urging members. Further, according to the foregoing embodiments, at least one of the two urging members is a leaf spring.

Further, according to the foregoing embodiments, the passage member is secured to a bottom valve disposed between the reservoir chamber and the bottom-side chamber. Accordingly, the rod acceleration reducing mechanism comprising the passage member, the partition, the urging members, etc. can be attached to the bottom valve.

Further, according to the foregoing embodiments, the damping force generating mechanism variably controls a damping force generated by movement of the piston. Accordingly, it is possible to effectively reduce noise such as rapping noise likely to be generated in a damping force control type shock absorber, and possible to suppress the generation of such noise.

Further, according to the foregoing embodiments, the partition is provided with an orifice allowing communication between the reservoir chamber and the bottom-side chamber through the passage member. Accordingly, the speed at which the partition is displaced in the passage member can be adjusted by the diameter and flow path area of the orifice, and the partition can be moved and stopped stably.

Meanwhile, a shock absorber according to the foregoing embodiments includes a check valve opening during the compression stroke of the piston rod, a cylindrical passage member provided between the bottom-side chamber in the cylinder and the reservoir chamber, a partition displaceably provided in the passage member and moved toward the bottom-side chamber in the passage member by a differential pressure generated between the reservoir chamber and the bottom-side chamber during the extension stroke of the piston rod, and an urging member urging the partition away from the bottom-side chamber, back toward the reservoir chamber, when the differential pressure between the reservoir chamber and the bottom-side chamber reduces. Accordingly, vibration of the piston rod (rod vibration) generated in response to opening of the compression-side check valve when the piston rod reverses the stroke direction from the extension stroke to the compression stroke can be canceled out by using rod vibration generated by a pressure change when the partition is displaced in the passage member. Consequently, generation of noise known as rapping noise can be reduced.

Further, according to the foregoing embodiments, the partition is moved toward the reservoir chamber in the passage member by a differential pressure generated between the reservoir chamber and the bottom-side chamber during the compression stroke of the piston rod. This structure also makes it possible to reduce and suppress generation of rapping noise.

Further, a shock absorber according to the foregoing embodiments includes a compression-side check valve provided on the piston and opening during the compression stroke of the piston rod, an extension-side check valve provided at the bottom of the cylinder and opening during the extension stroke of the piston rod, a damping force generating mechanism generating a damping force by the hydraulic fluid flowing out of or into the rod-side chamber in response to movement of the piston during the extension or compression stroke of the piston rod, a cylindrical passage member provided between the bottom-side chamber in the cylinder and the reservoir chamber, a partition displaceably provided in the passage member to define in the passage member a variable chamber that communicates with the bottom-side chamber and that is variable in volume, an urging member urging the partition toward the reservoir chamber, and a limiter limiting the movement of the partition toward the bottom-side chamber within a predetermined range. Accordingly, it is possible to cancel out rod vibration generated in response to opening of the extension-side check valve when the piston rod reverses the stroke direction from the compression stroke to the extension stroke and vibration of the piston rod (rod vibration) generated in response to opening of the compression-side check valve when the piston rod reverses the stroke direction from the extension stroke to the compression stroke by using rod vibration generated by a pressure change when the partition is displaced in the passage member. Consequently, the generation of noise known as rapping noise can be reduced.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-122427 filed on May 28, 2010.

The entire disclosure of Japanese Patent Application No. 2010-122427 filed on May 28, 2010 including specification, claims, drawings and summary is incorporated herein by reference in its entirety.

What is claimed is:

1. A shock absorber comprising:
a cylinder having a hydraulic fluid sealed therein;
a reservoir chamber provided in communication with an interior of the cylinder;
a piston slidably fitted in the cylinder to define a rod-side chamber and a bottom-side chamber in the cylinder;
a piston rod secured at one end thereof to the piston in the cylinder and projecting at the other end thereof to an outside of the cylinder through a rod guide;
a damping force generating mechanism adapted to generate a damping force by movement of the piston;
a check valve provided on the piston and adapted to open during a compression stroke of the piston rod;
a cylindrical passage member provided between the bottom-side chamber and the reservoir chamber in the cylinder;
a partition displaceably provided in the passage member to define in the passage member a variable chamber adapted to communicate with the bottom-side chamber, the variable chamber being variable in volume;
a first urging member adapted to urge the partition toward the reservoir chamber; and
a limiter adapted to limit movement of the partition toward the bottom-side chamber within a predetermined range,
wherein as an extension stroke of the piston rod changes to a compression stroke, the partition starts to move at a timing that is earlier than opening of the check valve.

2. A shock absorber according to claim 1, wherein the passage member comprises a cylindrical housing displaceably accommodating the partition, and
wherein, when movement of the partition is limited by the limiter, the limiter functions as a valve element that cuts off communication between the bottom-side chamber and an interior of the housing.

3. A shock absorber according to claim 2, wherein the housing is provided with a communicating hole communicating between the bottom-side chamber and the variable chamber, and
the partition comprises a free piston slidingly displaceable in the housing for cutting off communication between the bottom-side chamber and the variable chamber by the valve element.

4. A shock absorber according to claim 3, wherein a pressure-receiving area over which the partition receives a pressure in the bottom-side chamber is larger before than after movement of the partition is limited by the limiter.

5. A shock absorber according to claim 2, wherein a pressure-receiving area over which the partition receives a pressure in the bottom-side chamber is larger before than after movement of the partition is limited by the limiter.

6. A shock absorber according to claim 1, wherein a pressure-receiving area over which the partition receives a pressure in the bottom-side chamber is larger before than after movement of the partition is limited by the limiter.

7. A shock absorber according to claim 1, further comprising:
a second urging member adapted to urge the partition toward the bottom-side chamber;
the partition being displaceably urged in mutually opposite directions by the first and second urging members when displacement of the piston in the cylinder is at rest.

8. A shock absorber according to claim 7, wherein at least one of the first and second urging members is a leaf spring.

9. A shock absorber according to claim 1, wherein the passage member accommodating the partition is secured to a bottom valve disposed between the reservoir chamber and the bottom-side chamber.

10. A shock absorber according to claim 1, wherein the damping force generating mechanism variably controls a damping force generated by movement of the piston.

11. A shock absorber according to claim 1, wherein the partition is provided with an orifice allowing communication between the reservoir chamber and the bottom-side chamber through the passage member.

12. A shock absorber comprising:
a cylinder having a hydraulic fluid sealed therein;
a reservoir chamber provided in communication with an interior of the cylinder;
a piston slidably fitted in the cylinder to define a rod-side chamber and a bottom-side chamber in the cylinder;
a piston rod secured at one end thereof to the piston in the cylinder and projecting at the other end thereof to an outside of the cylinder through a rod guide;
a damping force generating mechanism adapted to generate a damping force by movement of the piston;

a check valve provided on the piston and adapted to open during a compression stroke of the piston rod;

a cylindrical passage member provided between the bottom-side chamber and the reservoir chamber in the cylinder;

a partition displaceably provided in the passage member and movable toward the bottom-side chamber in the passage member by a differential pressure generated between the reservoir chamber and the bottom-side chamber during an extension stroke of the piston rod; and an urging member adapted to urge the partition away from the bottom-side chamber and back toward the reservoir chamber, when the differential pressure between the reservoir chamber and the bottom-side chamber is reduced, wherein as the extension stroke of the piston rod changes to the compression stroke, the partition starts to move at a timing that is earlier than opening of the check valve.

13. A shock absorber according to claim 12, wherein the partition is moved toward the reservoir chamber in the passage member by a differential pressure generated between the reservoir chamber and the bottom-side chamber during the compression stroke of the piston rod.

14. A shock absorber comprising:

a cylinder having a hydraulic fluid sealed therein;

a reservoir chamber provided in communication with an interior of the cylinder;

a piston slidably fitted in the cylinder to define a rod-side chamber and a bottom-side chamber in the cylinder;

a piston rod secured at one end thereof to the piston in the cylinder and projecting at the other end thereof to an outside of the cylinder through a rod guide;

a compression-side check valve provided on the piston and opening during a compression stroke of the piston rod;

an extension-side check valve provided at a bottom of the cylinder and adapted to open during an extension stroke of the piston rod;

a damping force generating mechanism adapted to generate a damping force by the hydraulic fluid flowing out of and into the rod-side chamber in response to movement of the piston during the extension and compression strokes of the piston rod;

a cylindrical passage member provided between the bottom-side chamber and the reservoir chamber in the cylinder;

a partition displaceably provided in the passage member to define in the passage member a variable chamber adapted to communicate with the bottom-side chamber, the variable chamber being variable in volume;

an urging member adapted to urge the partition toward the reservoir chamber; and a limiter adapted to limit movement of the partition toward the bottom-side chamber within a predetermined range, wherein as an extension stroke of the piston rod changes to a compression stroke, the partition starts to move at a timing that is earlier than opening of the check valve.

* * * * *